WAVEGUIDE PHASE-LOCKED OSCILLATORS

Filed July 27, 1967 2 Sheets-Sheet 1

INVENTORS P. L. CLOUSER
J. E. GOELL
BY Sylvan Sherman
ATTORNEY

United States Patent Office 3,418,601
Patented Dec. 24, 1968

3,418,601

WAVEGUIDE PHASE-LOCKED OSCILLATORS

Paul L. Clouser, Stamford, Conn., and James E. Goell, Middletown, N.J., assignors to Bell Telephone Laboratories, Incorporated, Murray Hill, Berkeley Heights, N.J., a corporation of New York Filed July 27, 1967, Ser. No. 656,532
6 Claims. (Cl. 331—107)

ABSTRACT OF THE DISCLOSURE

This application concerns solid state microwave oscillators, employing negative resistance elements, that are free of oscillations below the cutoff frequency of the wavepath. In particular, the below-cutoff oscillation state, frequently encountered when negative resistance elements are placed in waveguide structures, is suppressed by placing a small shunt inductance near the negative resistance element, thus permitting the construction of a transmission-type phase-locked oscillator, and a more flexible single frequency reflection-type oscillator.

This invention relates to solid state microwave oscillators using negative resistance elements.

*Background of the invention*

The relatively recent development of solid state elements capable of operating at microwave frequencies, combined with their inherent advantages, such as compactness and low cost, has led to considerable interest in the use of such elements in microwave oscillators. Solid state phase-locked oscillators, for example, are being investigated with increasing interest for use as amplifiers in frequency and phase-modulated communications systems. (See, for example, H. L. Stover and R. C. Shaw, Injection Locked Oscillators as Amplifiers for Angle Modulated Signals, Proceedings of the 1966 Group on Microwave Theory and Technique, International Microwave Symposium, Palo Alto, May 1966.)

One class of solid state oscillators employs a negative resistance element such as, for example, an Esaki tunnel diode. However, a difficulty associated with the use of such devices is that a negative resistance element, when located in a waveguide, typically has a stable oscillation state at a frequency below the cutoff frequency of the waveguide. As is well known, power generated below the guide cutoff frequency is incapable of propagating for more than a few wavelengths and is eventually dissipated in the guide and the oscillator. Accordingly, the generation of wave energy at a frequency below the guide cutoff frequency represents a loss to the system.

*Summary of the invention*

The present invention is directed to arrangements for suppressing below-cutoff oscillations in oscillators of the kind described.

In accordance with the invention, below-cutoff oscillations are suppressed by locating a shunt inductive element, such as an iris or a septum, less than a quarter wavelength (measured at the desired operating frequency) from the negative resistance element. Advantageously, although not necessarily, the inductive element is located within the same transverse plane as the negative resistance element.

In one illustrative embodiment of the invention, a stable oscillator employs a thin, longitudinally extending septum as the inductive element. In a second illustrative embodiment, the active element is located between a pair of transversely extending septa in a reflection-type oscillator configuration. In this latter arrangement the use of the septa to suppress the below-cutoff oscillations has been found to increase the range of frequencies over which stable oscillations can be obtained by adjusting the piston position. In addition, by placing the inductive element in the same transverse plane as the negative resistance element, higher peak current diodes can be used, resulting in higher stable output power.

These and other advantages, the nature of the present invention and its various features, will appear more fully upon consideration of the various illustrative embodiments now to be described in detail in connection with the accompanying drawings.

*Brief description of the drawings*

FIG. 1A is an enlargement of a selected portion of FIG. 1;

*Detailed description*

Figures 1, 1A:
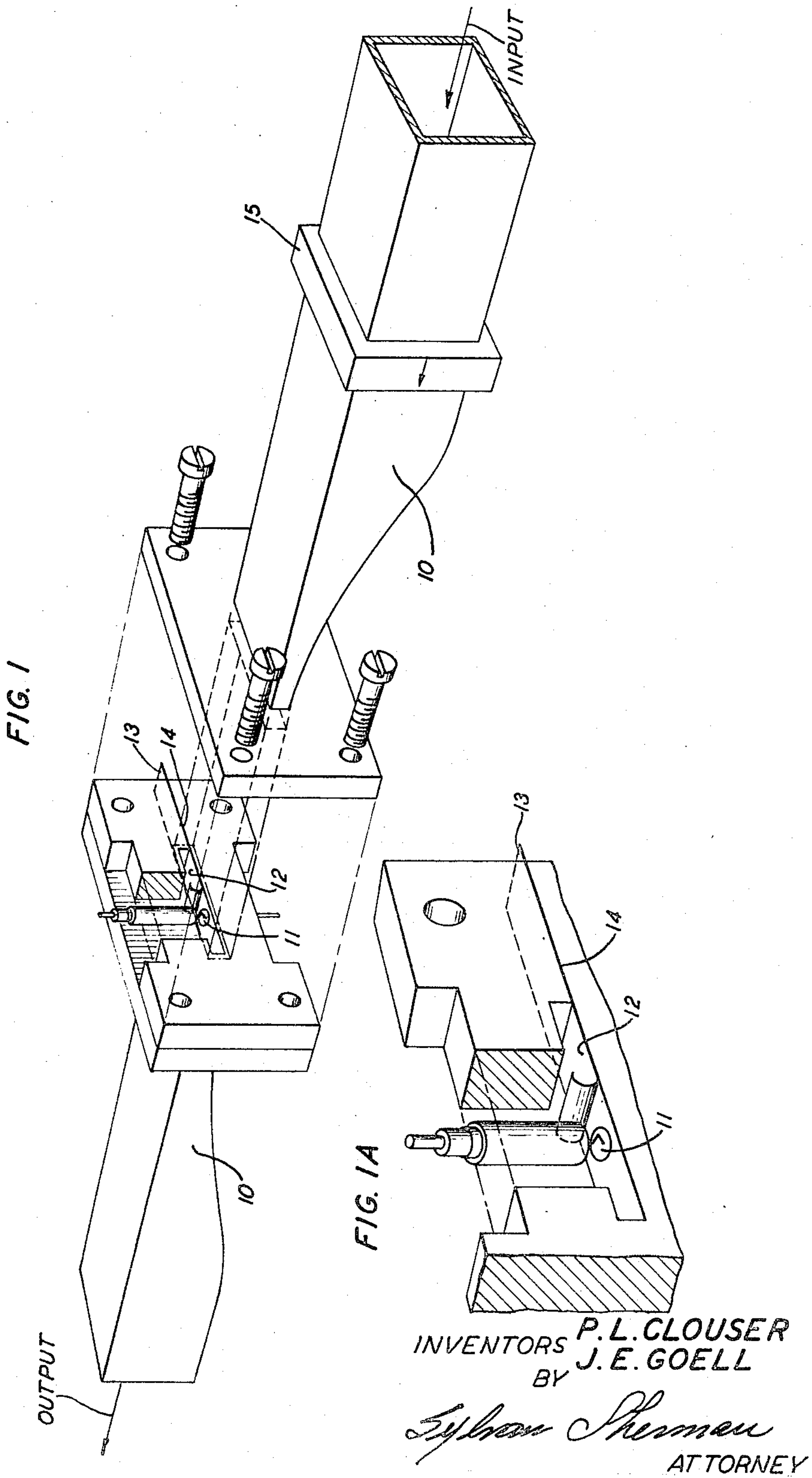
FIGS. 1 and 1A show perspective views of a first embodiment of the invention showing a transmission-type phase-locked oscillator in accordance with the invention.

Referring more specifically to FIG. 1, a phase-locked oscillator is shown as a first illustrative embodiment of the present invention. The oscillator comprises, in essence, a tapered section of waveguide 10, a negative resistance active element 11 disposed within the narrowest portion of waveguide 10, and a shunt inductive element 12.

The tapered section of waveguide 10 comprises a section of bounded electrical transmission line for guiding electromagnetic wave energy which, for example, can be a rectangular waveguide of the metallic shield type having a wide internal cross-sectional dimension uniformly of at least one-half wavelength of the wave energy to be supported therein and tapered in its narrow dimension. So proportioned, this section is supportive of propagating wave energy in the dominant mode, known in the art at the $TE_{10}$ mode. At those lower frequencies for which waveguide 10 is less than a half wavelength wide, the waveguide is cut off, and is incapable of supporting wave energy in a propagating mode.

While the wide dimension of the internal cross section remains constant throughout the length of the section, the narrow dimension of the waveguide is advantageously reduced until the wave guide impedance is appropriately match to that of the diode. Since the narrow dimension of a full height waveguide is substantially one-fourth of the wavelength of the dominant mode in typical waveguides, this minimization can be conveniently effected by providing a continuous variation of the dimension from one-quarter wavelength at the input end, to the minimum height where the negative resistance element is placed, and back to one-quarter wavelength at the output end. This variation is contrived to provide a smooth transition throughout the entire length of the section. Specifically, the section is proportioned to support the dominant mode of wave propagation while at the same time matching the impedance of the negative resistance element.

Disposed in the minimum height portion of section 10 is the negative resistance active element 11, such as, for example, a tunnel diode. (For a description of an Esaki tunnel diode, see Leo Esaki, New Phenomenon in Narrow Germanium P-N Junctions, Phiysical Review, No. 109, pp. 603–604, Jan. 15, 1958.) The parameters of the diode are chosen, in accordance with principles well known in the art, so that oscillations in waveguide section 10 occur at a desired frequency above cutoff. In addition, for a phase lock oscillator, the diode capacitance preferably is made low to optimize its locking range. Means (not shown) are also provided for biasing the tunnel diode to its negative resistance region.

Also disposed in waveguide section 10 and, located essentially in the same cross-sectional plane as the negative resistance element, is a shunt inductive element 12, adapted to permit transmission of microwave wave energy while, at the same time, suppressing oscillations at frequencies below the cutoff frequency of the waveguide.

Element 12 is proportioned such that its inductive reactance, over the range of frequencies below the guide cutoff frequency, is small compared with the capacitive reactance of element 12, as will be explained in greater detail hereinbelow. For greater clarity, the region near the reduced height portion of waveguide is shown in FIG. 1A in an enlarged view.

In the first embodiment of the invention, element 12 comprises a thin metal plate of good conductivity, oriented with its long dimension extending longitudinally along the guide. Advantageously, this element, hereinafter referred to as a longitudinal septum, has a thin transverse portion 13 extending through a slit 14 in one of the narrow walls of the waveguide so that the transverse distance between the longitudinal portion of the septum and the negative resistance element 11 can be mechanically adjusted from outside the assembled oscillator. In addition, an isolator 15 is placed at the input terminal of waveguide section 10 to prevent microwave power from reaching the input end of the section. (The operation and structure of a wideband isolator is described by Anderson and Hines in Wide-Band Resonance Isolator, I.R.E. Transactions on Microwave Theory and Techniques, vol. MTT–9, p. 63, January 1961.)

In operation, a phase-locking microwave signal is introduced at the input end of waveguide section 10. Element 11, which is stabilized to above-cutoff oscillations by the shunt inductive element 12, locks in phase with this signal, radiating power toward both the input and the output ends of section 10. The power radiated toward the output is transmitted, while that radiated toward the input is absorbed by the isolator 15.

A simplified explanation of the theory of operation of the invention is that the inductive element suppresses below-cutoff oscillations by reducing the total inductive reactance of the oscillator circuit at below-cutoff frequencies to a value less than the total capacitive reactance of the oscillator. This reduction prevents resonance at below-cutoff frequencies.

Figure 2A:
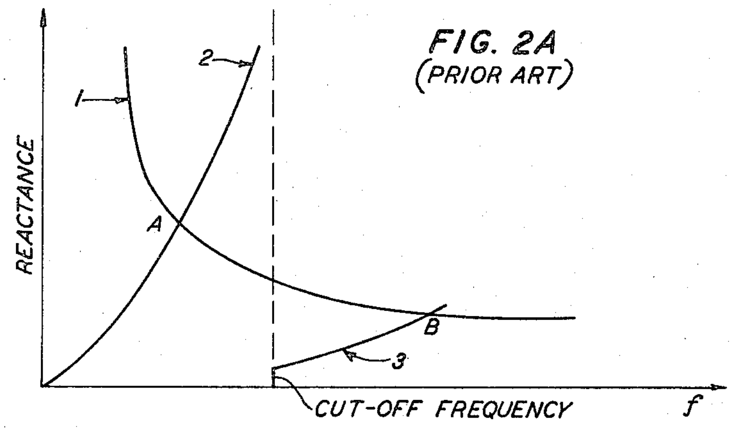
FIGS. 2A and 2B, included for purposes of explanation, show the variation in reactance as a function of frequency, for the various oscillator components.

FIG. 2A, included for purposes of explanation, illustrates the manner in which the effective capacitive and inductive reactances vary as a function of frequency for a prior art oscillator without a shunt inductive element. These curves show, in a simplified manner, the cause of below-cutoff oscillations. Curve 1 is the negative capacitive reactance curve of a typical negative resistance element, such as a tunnel diode. Curves 2 and 3 are the inductive reactances of the circuit for below- and above-cutoff frequencies, respectively. The discontinuity in the inductive reactance is due primarily to the fact that the inductive reactance of the waveguide approaches infinity for values of frequency approaching the cutoff frequency and is substantially zero for values of frequency above cutoff. Points A and B correspond to oscillation states where the effective inductive reactance is equal to the negative capacitive reactance, A being below cutoff and B being above. Experimentally, the device nearly always oscillates at point A, the below-cut off frequency.

Figure 2B:
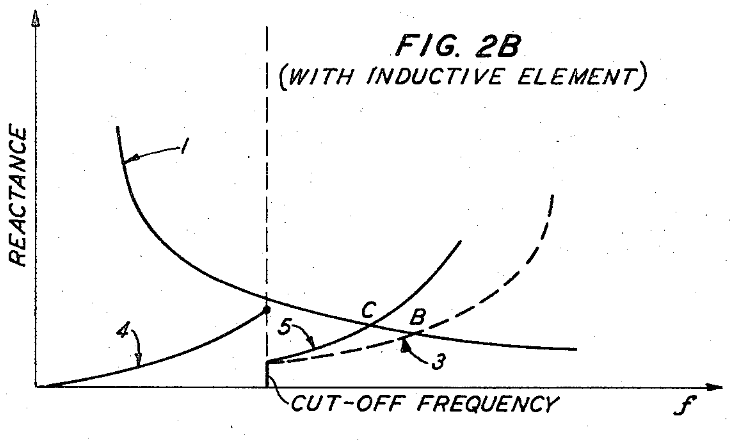

FIG. 2B illustrates the effect of placing a small shunt inductive reactance near the negative resistance element. Curve 4 is the new effective below-cutoff inductive reactance. Curve 5 is the new above-cutoff inductive reactance curve. Point C corresponds to the new stable oscillation state. When the added shunt inductive reactance is sufficiently small, in comparison with the capacitive reactance for frequencies below cutoff, the two curves, 1 and 4, no longer intersect at a frequency below cutoff, and thus, the below-cutoff state is suppressed. The added shunt inductance, however, has relatively little effect upon the above-cutoff frequency effective inductance and a stable, above-cutoff oscillatory state exists at a point C. The latter is near point B but at the slightly lower frequency. The device can thus oscillate at only a frequency above the cutoff frequency.

Figure 3:
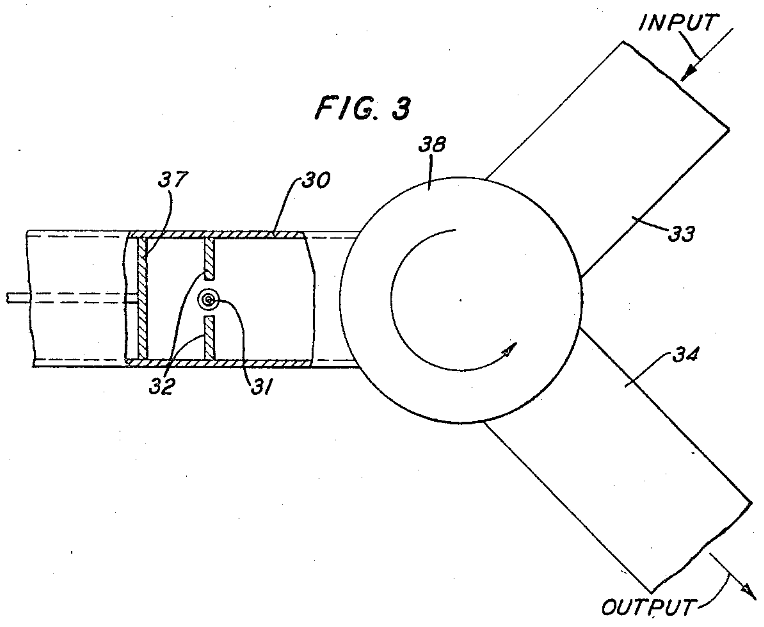
FIG. 3 is a perspective view of a second embodiment of the invention showing a reflection-type phase-locked oscillator in accordance with the invention.

FIG. 3 shows a second illustrative embodiment of the invention comprising a tunable, reflection-type oscillator. In FIG. 3 there is shown a tapered matching section of wavepath 30 terminated by an adjustable shorting piston 37. A negative resistance active element 31 is placed within the section 30 between a pair of transverse septa which form an inductive slit or iris. (See p. 164 of Principles of Microwave Circuits by Montgomery, Dicke and Purcell.) Advantageously, a three terminal circulator 38 is connected to section 30 in order to separate the input and the output branches 33 and 34 of the system. (The operation of a circulator and examples of three terminal circulators can be found in Fox et al., Behavior and Applications of Ferrites in the Microwave Region, Bell System Technical Journal, vol. 34, p. 5, January 1955. Also see Fay and Comstock, Operation of the Ferrite Junction Circulator, I.E.E. Transactions on Microwave Theory and Techniques, vol. MTT–13, p. 15, January 1965.)

The operation of the oscillator of FIG. 3 and the manner of suppressing below-cutoff oscillations is essentially the same as explained in connection with the embodiment shown in FIG. 1.

In all cases, the above-described arrangements are illustrative of a small number of the many possible specific embodiments which can represent applications of the principles of the invention. For example, the embodiments shown used Esaki tunnel diodes, but other negative resistance active elements, such as the higher power Gunn or LSA mode oscillators, are equally adaptable for use in the invention. Moreover, while the only inductive elements shown were a longitudinal septum and an inductive iris, other forms of shunt inductive elements can be used to accomplish the same result. Thus, numerous and varied other arrangements can be readily devised in accordance with these principles by those skilled in the art without departing from the spirit and scope of the invention.

What is claimed is:

1. An oscillator comprising:
   a section of wavepath having a cutoff frequency;
   a negative resistance active element disposed within said section of wave path;
   and a shunt inductive element, positioned within said section in proximity to said negative resistance element, proportioned to suppress oscillations below said cutoff frequency and to permit propagation of wave energy above said cutoff frequency.

2. The oscillator in accordance with claim 1 wherein said shunt inductive element is located essentially within the same transverse plane as said active element.

3. The oscillator in accordance with claim 1 wherein said section of wavepath is characterized by an inductive reactance at frequencies below said cutoff frequency;
   wherein said negative resistance active element is characterized by a capacitive reactance;
   and wherein the combined inductive reactance of said shunt inductance and the inductive reactance of said section of wavepath is less than the capacitive reactance of said negative resistance element at all frequencies below the cutoff frequency of said section of wavepath.

4. The oscillator in accordance with claim 1 wherein said section of wavepath comprises a tapered matching section of waveguide;
   wherein said negative resistance active element is a tunnel diode disposed in the matching portion of said section of waveguide;

and wherein said shunt inductive element comprises a longitudinal septum.

5. The oscillator in accordance with claim 1 including an adjustable reflecting piston;

wherein said section of wavepath comprises a tapered matching section of waveguide terminated at one end by said adjustable piston;

wherein said shunt inductive element comprises two symmetrically extending transverse septa forming an inductive iris;

and wherein said negative resistance active element is disposed between said septa.

6. An oscillator comprising:

a first section of wavepath having a particular characteristic impedance and a specific cutoff frequency;

a second section of wavepath coupled to said first section having a different characteristic impedance to provide a broadband match to a negative resistance active element;

a negative resistance active element disposed within said second section;

and a shunt inductive element positioned in said second section in proximity to said negative resistance element, proportioned to suppress oscillation below said cutoff frequency and to permit propagation of wave energy above said cutoff frequency.

No references cited.

JOHN KOMINSKI, *Primary Examiner.*

U.S. Cl. X.R.

133—34, 98; 331—96